Figure 1:
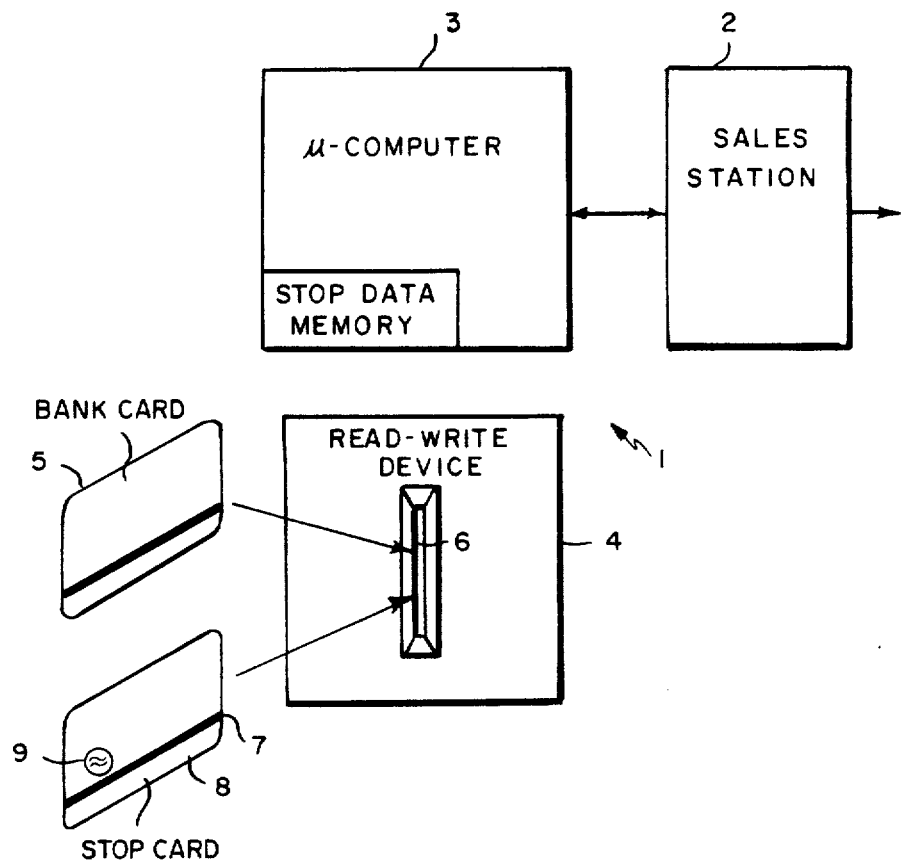

United States Patent [19]

Stockburger et al.

[11] Patent Number: 4,535,418
[45] Date of Patent: Aug. 13, 1985

[54] DATA CARRIER CONTROLLED DATA PROCESSING

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[21] Appl. No.: 445,378
[22] PCT Filed: Mar. 23, 1982
[86] PCT No.: PCT/EP82/00060
§ 371 Date: Nov. 17, 1982
§ 102(e) Date: Nov. 17, 1982
[87] PCT Pub. No.: WO82/03288
PCT Pub. Date: Sep. 30, 1982

[30] Foreign Application Priority Data

Mar. 23, 1981 [DE] Fed. Rep. of Germany ....... 3111353

[51] Int. Cl.³ ............................................. G06F 3/00
[52] U.S. Cl. ................................... 364/900; 235/379
[58] Field of Search ................... 364/900 MS File; 235/379, 382; 340/825.31, 825.34

[56] References Cited
U.S. PATENT DOCUMENTS 3,845,277 10/1974 Voss et al. .................. 235/61.7
4,314,352 2/1982 Fought .......................... 364/900

Primary Examiner—Raulfe B. Zache
Attorney, Agent, or Firm—Donald Brown

[57] ABSTRACT

The invention relates to a method in which the action of a data processing device can be initiated by entering information which has been recorded on a data carrier. In order to be able to prevent misuse of such data carriers, particularly in the case of the latter being lost, by third parties, the data processing facility can be set in such a way that the initiation by the data carrier is blocked. A data processing device (1) comprises a blocking circuit (14) by means of which the initiation by a predetermined data carrier is prevented. In particular, the data carrier transport can be controlled in such a way that a predetermined data carrier is not output again after having been input into a read-write device.

5 Claims, 2 Drawing Figures

DATA CARRIER CONTROLLED DATA PROCESSING

The invention relates to a method with which the reaction of a data processing device can be initiated by entering information which is recorded on a data carrier.

In addition, the device relates to a data processing device for carrying out the method.

Data processing devices of the most varied types are known in which a process is initiated by means of a bank card, identity card, an authority card, a cheque card or the like. For example, the holder of an appropriate bank card can withdraw amounts of money up to a certain amount at a whole network of cash dispensers. Furthermore, on production of the authority card, he can also withdraw corresponding amounts of money in those branches in which no cash dispensers are installed as yet. If the authorised holder loses the card he is obliged to report this fact immediately so that the bank can inform all branches with or without automatic dispenser in writing about the lost card, in order to keep any damage arising out of the misuse of the card by third parties as small as possible.

It is the object of the invention to create a method of the type initially described by means of which the above disadvantage is avoided. Furthermore, it is intended to specify a device for carrying out the method.

This object is achieved by means of a method of the type initially described which, in accordance with the invention, is characterised in that in order to prevent initiation by a predetermined data carrier, parameters in the data processing facility are set in such a manner that the initiation by this data carrier is blocked.

According to the invention, the data processing device is characterised in that a settable blocking circuit is provided for preventing the initiation by a predetermined data carrier.

Figure 2:
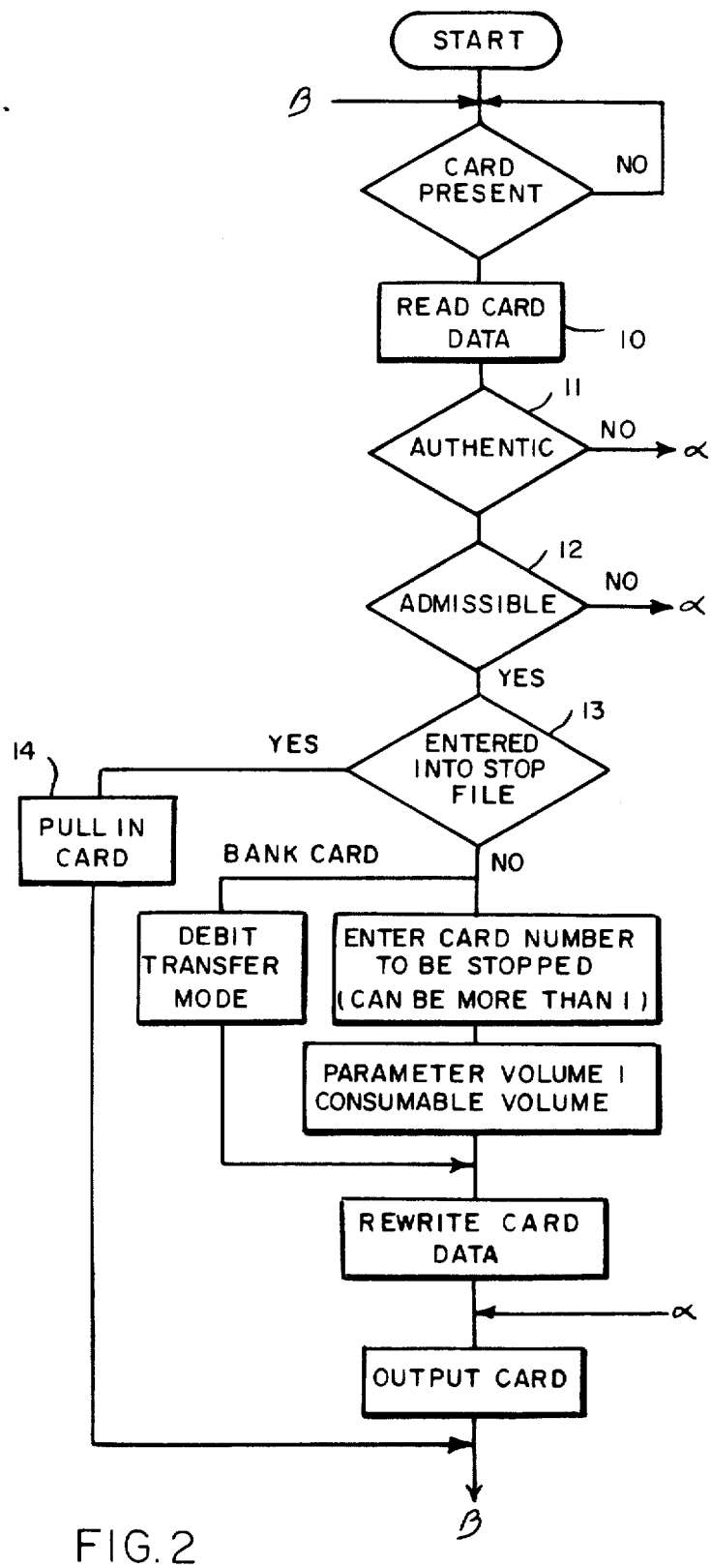

Further features and suitable characteristics of the invention follow from the description of an illustrative embodiment with reference to the Figures, in which:

FIG. 1 shows a diagrammatic representation of the building blocks of the data processing device and FIG. 2 shows a diagrammatic representation for explaining the method.

The data processing device 1 comprises a station 2, a micro-computer 3 and a read-write device 4. The station 2 is, for example, a cash dispenser. The dispensing of money is initiated when an authorised person introduces a bank card 5 into an input slot 6 of the read-write device 4. The read-write device is provided with a transport facility, not shown, by means of which the bank card is first pulled in for card analysis and possible writing-in of new data and is output again after the process has finished. The micro computer comprises a ROM memory and a RAM memory. The RAM memory is preferably constructed as a non-volatile memory.

The control circuit, essentially formed by the ROM memory, of the micro-computer 3 is constructed in such a way that a user can use his bank card 5 to initiate a certain process, for example the dispensing of an amount of money within the limits of the credit allowed, from the station 2.

If the loss of the bank card 5 is reported to the operator of the data processing device 1, the operator inputs a command for blocking the use of the bank card 5 with all individual data characterising the card 5 on a magnetic track 7 of a data carrier which hereinafter is called a stopcard 8. Such a stopcard is sent to all places which operate such a station 2, that is to say in the case of the cash dispensers to all bank branches. There the stopcard is put into the read-write device 4 like a bank card. The stopcard 8 is analysed and, particularly, the command is read out. The signal which is read out is fed to the micro-computer. The parameters of the micro-computer are changed by the command in such a way that the lost bank card 5 can no longer be used to initiate any dispensing by the station 2. After the command for blocking a certain bank card has been read out, the point in time, that is to say the time of day and the date of the reading-out of the command is written into the magnetic strip 7 of the stopcard 8 via the read-write device 4. Thus the stopcard represents an acknowledgement of the fact that the blocking has been carried out. The place issuing the stopcard can have the stopcards sent back by the individual branches and can thus satisfy itself that the procedure has been carried out correctly and that manipulations are impossible. In the illustrative embodiment shown, the stopcard has an individualising mark 9. This is employed by the operator before use to set a code defining the personal identification, in order to ensure that the blocking is done only by a properly authorised person.

The control circuit of the micro-computer 3 is constructed in such a way that it can give a signal to the data carrier transport in such a way that this device no longer outputs a data carrier 5, the use of which has been blocked in the manner described above. In this way the card is taken out of circulation at the very first attempt.

As can be seen particularly from FIG. 2, the method proceeds in detail as follows:

The central office sends the stopcard 8 to the branch establishment which looks after the station 2. The authorised operator sets the personal code on the individualising mark 9. Then the stopcard 8 is introduced into the slot 6 of the read-write device 4. This initiates the control process which is essentially determined by the ROM memory in the micro computer 2 (sic). The card information is read out by means of a read-write device 10. The data are fed to a comparator 11 of the micro-computer which checks the authenticity of the card by comparing characteristics which individualise the stopcard with the coded data read into the magnetic track. If authenticity is not established, the card is output and the data processing device 1 returns to the state of operational readiness. If the authenticity of the stopcard is confirmed, a comparator 12 compares the personal code specified by the setting of the individualising mark 9 with the code produced from the entry on the magnetic track. If agreement is not established, the stopcard is output and the device returns to the state of operational readiness. However, if the agreement shows that the user is indeed the authorised person, then the command produced from the entry on the magnetic track 7 is read into the non-volatile memory. The magnetic track 7 preferably also contains information, which hereinafter is called the parameter volume, as to the number of stations in which the stopcard 8 may be used legitimately. After the reading-out, the micro computer supplies a signal to the read-write device 10 which causes the new parameter volume, reduced by the number 1, to be once again written into the magnetic track. Subsequently, the point in time at which the stopcard is read out is written in and then the latter is output again and the device is placed into operational readiness again.

If a third party then attempts to actuate the station 2 by means of the bank card 5 which has been reported as lost, the card information is first read out as in the process described above, then the marks individualising the card are compared with the coded data read into the magnetic track in order to check the authenticity of the card. If the authenticity is confirmed, the information individualising the bank card 5 is compared in a comparator 13 with the blocking commands entered by means of the stopcard 8. If the data are found to agree, the comparator 13 supplies an output signal to a blocking circuit 14, which signal triggers the data carrier transport of the read-write device 4 in such a manner that the bank card 5 is not output again. The device is preferably provided, on its side opposite to the input opening, in the interior with a collecting space into which the bank card is moved so that the read-write device is free to be actuated by further bank cards.

In the illustrative embodiment described above the micro-computer 3 and the read-write device 4 are components of the data processing device including the output station 2. In principle, however, it is also possible to construct the micro-computer 3 and the read-write device 4 as a separate unit, independent of the actual station 2, that is to say, for example, independent of the actual cash dispenser, and to make this separate unit available to those institutes which do not as yet have a complete station as described above and which, for this reason, dispense the money or goods or carry out a service upon presentation of the appropriate bank cards. In this case, the unit consisting of micro-computer 3 and read-write device 4 can accept the command for retaining the lost bank cards via a stopcard 8 in the same manner as above. Thus, if a customer goes to a branch and wishes, for example, to use the lost bank card 5 to withdraw money, the bank card is input into the read-write device for checking. If the comparator 13 finds that this card has been reported as blocked, the card is retained in the same manner as with the example described above. Thus the operating personnel no longer has to check in documents to see if such a bank card has been reported as lost.

The invention has been described above by means of the example of cash dispensing stations. Such stopcards can, however, also be used with all other data processing devices in which a process can be initiated by means of data entered on an individual data carrier. Thus lost control cards, permanent-user cards, identity cards, cheque cards or the like can be cancelled and/or taken out of circulation by means of the invention described above. A stopcard itself can also be reported as lost and be excluded from further use, if its data are input into the station by means of a third stopcard.

We claim:

1. A data carrier controlled data processing system for receiving a first data carrier having data stored thereon relating to another data carrier to be received by said system, said system including first means for authenticating the validity of said first data carrier, second means for comparing a personal code of the user with data on said first data carrier to determine if the user is authorized, and third means for reading data relating to another data carrier from said first data carrier into said system if both the first data carrier is authenticated as being a valid data carrier by said first means and the user thereof has been determined to be authorized by said second means.

2. A data processing system for receiving a first and second data carriers and reading and writing data on said data carriers, said system comprising first means for verifying if the user of said first data carrier is authorized and upon determining said user is authorized said first means causes said second means to read data into the system relating to said second data carrier.

3. The system of claim 2 wherein said second means also writes data into said first data carrier acknowledging that data relating to said second data carrier has been read into the system.

4. The system of claim 3 in which said second means also writes data into said first data carrier reducing the number of additional uses allowed with said first data carrier.

5. A data carrier controlled data processing system comprising means for reading data from a data carrier presented to said system, said data comprising data related to the validity of said data carrier to enable said data processing system, means for checking said data carrier to determine whether it is a control data carrier containing validity information related to the data of invalid data carriers which are to be excluded from enabling said processing system, means for writing said validity information into a memory of the system if said data carrier has been identified as a control data carrier, means for comparing said validity information from said memory with said data read from said data carrier, if said data carrier has not been identified as a control data carrier, and for indicating that said data carrier is to be excluded from enabling said processing system in case said data carrier has been found as invalid.

* * * * *